United States Patent
Triandaf et al.

(10) Patent No.: US 6,763,271 B2
(45) Date of Patent: Jul. 13, 2004

(54) TRACKING SUSTAINED CHAOS

(75) Inventors: Ioana Triandaf, Alexandria, VA (US); Ira B. Schwartz, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 323 days.

(21) Appl. No.: 09/834,922

(22) Filed: Apr. 12, 2001

(65) Prior Publication Data

US 2002/0176455 A1 Nov. 28, 2002

(51) Int. Cl.[7] .............................................. G05B 13/02
(52) U.S. Cl. ............................ 700/38; 700/32; 700/40; 700/54
(58) Field of Search ............................... 700/28, 32, 33, 700/38, 39, 44, 45, 54, 80; 318/561; 702/82, 86; 380/263

(56) References Cited

U.S. PATENT DOCUMENTS

| | | | |
|---|---|---|---|
| 5,057,992 A | * 10/1991 | Traiger ........................ | 700/52 |
| 5,442,510 A | * 8/1995 | Schwartz et al. ............. | 700/32 |
| 5,473,694 A | 12/1995 | Carroll et al. | |
| 5,510,976 A | * 4/1996 | Tanaka et al. ................ | 700/54 |
| 5,818,712 A | 10/1998 | Glenn, Sr. et al. | |
| 5,836,974 A | * 11/1998 | Christini et al. .............. | 607/5 |
| 5,926,385 A | * 7/1999 | Lee .............................. | 700/38 |
| H1945 H | * 3/2001 | Schwartz ..................... | 380/46 |
| 6,326,758 B1 | * 12/2001 | Discenzo .................... | 318/609 |
| 6,606,526 B1 | * 8/2003 | Spano et al. .................. | 700/91 |
| 6,611,794 B1 | * 8/2003 | Fleming-Dahl ............. | 702/191 |

FOREIGN PATENT DOCUMENTS

| | | | | |
|---|---|---|---|---|
| JP | 07210212 A | * 8/1995 | ........... | G05B/13/02 |
| JP | 07261806 A | * 10/1995 | ........... | G05B/13/02 |
| JP | 08200846 A | * 8/1996 | ........... | F25B/01/00 |

OTHER PUBLICATIONS

Venkatasubramanian, Ji, "Coexistence of Four Different Attractors in a Fundamental Power System Model", IEEE Transactions on Circuits and Systems—I, Mar. 1999, pp. 405–409, vol. 46, issue 3.*

Clayton, "Basic Concepts in Nonlinear Dynamics and Choas", a workshop presented at the Society for Chaos Theory in Psychology and the Life Sciences Meeting, Jul. 1997.*

Ji, Venkatasubramanian, "Hard–limit induced chaos un a single machine infinite bus power system", Proceedings of the 34th IEEE Conference on Decision and Control, Dec. 1995, pp. 3465–3470, vol. 4.*

Spano, "Aspects of Chaos", Physics Department Colloquium, Oct. 1995, Abstract.*

(List continued on next page.)

*Primary Examiner*—Ramesh Patel
*Assistant Examiner*—Crystal J. Barnes
(74) *Attorney, Agent, or Firm*—John J. Karasek; L. George Legg

(57) ABSTRACT

A control method and system are provided to sustain chaos in a nonlinear dynamic system. A sustained transient that is tracked as a system parameter is substantially varied thereby allowing sustained chaotic transients to exist far away from the crisis parameter values. The method includes targeting points near a chaotic transient once the iterates reach a neighborhood of an undesired attractor. Targeting is done so that the natural dynamics of the system would not engage again the iterations and chaotic motion. A brief parameter fluctuation forces the attractor to be a repeller so that a point which lies on the previously existing chaotic transient can be targeted. Consequently, instead of landing on the attractor, the iterations will reach a region of phase space where a chaotic transient is present, causing the chaotic motion to be reexcited.

21 Claims, 7 Drawing Sheets

OTHER PUBLICATIONS

Yang, Ding, Mandell, Ott, Preserving Chaos: Control Strategies To Preserve Complex Dynamics With Potential Relevance To Biological Disorders, The American Physical Society, Jan. 1995, pp. 102–110, vol. 51, No. 1.

Schwartz, Sequential Horsehoe in the birth and Death of Chaotic Attractors, The American Physical Society, Apr. 4, 1988, pp. 1359–1362, vol. 60, No. 14.

In, Mahan, Ditto, Spano, Experimental; Maintenance of Chaos, The American Physical Society, May 29, 1995, pp. 4420–4423, vol. 74, No. 22.

Chen, Lai, Feedback control of Lyapunov Exponents for Discrete–Time Dynamical Systems, article to appear in the International Journal of Bifurcation and Control 1996, 16 pages.

Kacperski, Holyst, Control of Crisis–Induced Intermittency in the Dynamics of a Kicked, Damped Spin, The American Physical Society, May 1997, pp. 5044–5049, vol. 55, No. 5.

* cited by examiner

TRACKING SUSTAINED CHAOS

BACKGROUND OF THE INVENTION

1. Field of the Invention

The present invention relates to control of nonlinear systems and, more particularly, to a control system for tracking, i.e., sustaining, chaotic transients in a nonlinear, dynamic system, whereby tracking is meant that a parameter is varied.

2. Background of the Invention

Classical control techniques utilize instantaneous feedback or feedback based on sampling. Such techniques are generally based on linear or small signal modeling. However, in the absence of robust, accurate, analytical models, it is difficult to control nonlinear systems with such techniques. Some nonlinear systems, such as multimode lasers with nonlinear crystals, are not amenable to accurate modeling. Classical control of such systems may be performed, if at all, on a trial and error basis and may be extremely difficult, expensive and inflexible. When control in such systems is lost, very little is done except to recognize such loss of control. For a discussion of such control systems see, e.g., U.S. Pat. No. 5,163,063 to Yoshikawa et al.

Chaos can be a desirable feature in many applications. In biology, the disappearance of chaos may signal pathological phenomena. In mechanics, chaos could be induced in order to prevent resonance, such as in a system of coupled pendulums, where one can excite chaotic motion of several modes spreading the energy over a wide frequency range. In optics, material damage is caused by lasers having a peak intensity at a given temporal frequency, so chaos is desirable since it has broadband spectra. It has also been suggested that chaos occurs for normal machine tool cutting, making chaos preservation a desired control for deeper than normal cutting.

Recent developments in nonlinear dynamics have shown that most nonlinear systems have steady-state, periodic or chaotic attractors in phase space. The chaotic attractors contain an infinite number of unstable periodic orbits. A technique (the "OGY technique") has been reported for stabilizing the nonlinear system in the neighborhood of unstable orbits by directing subsequent iterates towards the local stable manifold of the selected orbit as described by Ott, Grebogi and Yorke in "Controlling Chaos," Phys. Rev. Left. 64 1196, (1190). Upon application of the OGY technique, the nonlinear system remains on that particular orbit.

A disadvantage of the OGY technique is that its application is not feasible if the periodic orbit or unstable steady state near which control is desired is not known. Furthermore, some operating conditions which are not in the neighborhood of any identifiable orbit will not be accessible to control. In addition, the OGY technique is not amenable to tracking the system over a wide range of operating conditions since the control becomes less effective as the operating point is brought further away from the orbit or state.

An additional problem of maintaining chaos occurs when there exists a chaotic transient in the presence (e.g., neighborhood) of a periodic attractor. One method of sustaining chaotic transients in the presence of another non-chaotic attractor includes using the natural dynamics of unstable states laying on the basin boundary separating a periodic attractor from chaotic transients, referred to as basin saddles. Although there is technically only one attractor since chaos is a transient, there is still a stable manifold which separates the chaotic transient from the periodic attractor. Once the flow gets in a neighborhood of a basin saddle, small perturbations of an accessible system parameter are used to redirect the flow towards the chaotic transient region. This is done by a targeting technique which uses the linearization of the flow about the saddle.

These and other current approaches to sustaining chaos use an algorithm that requires accurate knowledge of the dynamics in the region where chaos disappears, as well as knowledge of the pre-iterates of this region. Typically, these approaches employ an analytic scheme for sustaining chaos that uses state variable control which tends to be tedious since it involves close monitoring of the escape region.

BRIEF SUMMARY OF THE INVENTION

In accordance with the present invention, a segmentation control method is provided to sustain chaotic transients in dynamical systems. The sustained transient can be tracked as a system parameter is substantially varied, allowing sustained chaotic transients far away from crisis parameter values.

In accordance with the present invention, a method is provided for controlling the operation of a nonlinear system which is responsive to a parametric signal for sustaining and tracking a chaotic system. The method comprises representing a nonlinear dynamic system as a function of a system parameter and an output value. An initial parametric signal is generated corresponding to a first value of the system parameter. An output signal is produced corresponding to an output value from the nonlinear system in response to the parametric signal. Iterations are performed on the function and parametric perturbations are activated to generate a new parametric signal corresponding to a new value if a current iteration falls within a predetermined neighborhood of a previous iteration.

In accordance with another aspect of the present invention, a controller is provided for the operation of a nonlinear system responsive to parametric signals for sustaining and tracking a chaotic system. The controller comprises a monitor for detecting an output value from the nonlinear system and a processor for calculating iterations of a function representing the nonlinear dynamic system as a function of a parameter value and the output value. The processor is operable to perform parametric perturbations to generate a new parametric value if a current iteration falls within a predetermined neighborhood of a previous iteration. An input device applies the parametric value to the nonlinear system.

In accordance with yet another aspect of the present invention, a system is provided for controlling the operation of a nonlinear system. This system comprises means for generating a parametric signal having a parametric value and controlling means responsive to the parametric signal for controlling the nonlinear system. The controlling means includes a modulator that is responsive to the parametric signal and a feedback signal for producing and applying an input signal to the nonlinear signal to cause the nonlinear system to produce an output signal having an output value which is chaotic. Means responsive to the output signal produce the feedback signal. Correcting means are operable, when a current iteration of a function representing the nonlinear system in terms of the parameter value and the outputted value fall within a predetermined neighborhood of a previous iteration, for performing parameter perturbations to vary the feedback signal.

In accordance with a further aspect of the present invention, a system is provided for tracking the operation of a nonlinear system. This system comprises means for generating a parametric signal at an initial time with an initial selected value and at least one subsequent time with at least one subsequent value different from the initial value. Means responsive to the parametric signal control the nonlinear system at the initial time and at the at least one subsequent time. The controlling means comprises a modulator that is responsive to the parametric signal and a feedback signal for producing and applying an input signal to the nonlinear system to cause the nonlinear system to produce an output signal which is chaotic. Means responsive to the output signal produce and vary the feedback signal when a current iteration of a function representing the nonlinear dynamic system in terms of a value of the parametric signal and a value of the output signal fall within a predetermined neighborhood of a previous iteration.

One key feature of the present invention is that instead of preventing escape to an attractor in advance, the present invention takes a global view of the phase space at the crisis value and eliminates the cause of the crisis. This is achieved through briefly changing the configuration of the phase space by temporarily suppressing a suitable attractor. A main advantage of the present method, not previously found in the art, is that the maintained chaotic state can be tracked (i.e., sustained) over a wide parameter region, whereas other methods involve holding the parameter fixed.

Another key feature of the present invention is that only local knowledge of the dynamics is necessary. In contrast to the prior art algorithms of sustained chaos, knowledge of the dynamics in the region where chaos disappears, or of the pre-iterates of this region are not necessary in the present invention.

Yet another feature of the present invention is the application of algorithms that act by using parameter perturbations.

Another feature of the present invention is an algorithm that allows tracking to sustain chaos. Consequently, chaos is sustained not only at a fixed parametric value. The parametric value can be varied and the algorithm can be applied at the new parametric value.

Another feature of the present invention is the employment of an algorithm that does not require analysis of escape regions which tends to be very tedious and may be impossible in high-dimensional systems.

A further feature of the present invention is an algorithm that can be applied to a dynamic system to sustain chaos even after chaos disappears and the dynamic system has settled on a periodic orbit. Prior art algorithms for sustained chaos fail to provide such a desirable feature.

Still a further feature of the present invention is an algorithm that uses linearization about an attractor rather than about a basin boundary saddle. As a result of this feature, the algorithm is more robust as compared with an algorithm which implements linearization about a basin saddle.

Further features and advantages of the present invention will be set forth in, or apparent from, the detailed description of preferred embodiments thereof which follows.

DETAILED DESCRIPTION OF THE INVENTION

Figure 1:
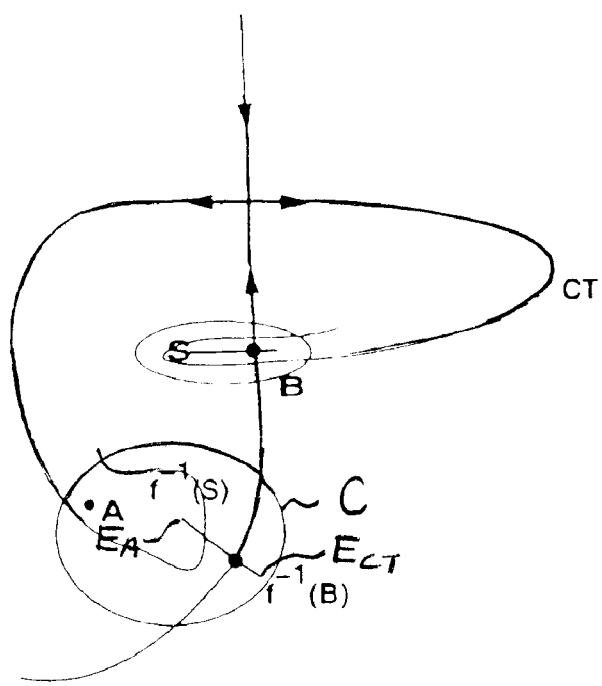
FIG. 1 depicts global topology for sustained chaos based on a basin boundary saddle according to the present invention.

The present invention is directed to maintaining chaos in a system. The disappearance of chaos is frequently due to the collision of the chaotic attractor with a branch of saddles. The stable manifold of the saddle at the intersection with the chaotic attractor forms the basin boundary between the chaotic attractor and a periodic attractor. The present invention provides a method to instantaneously and briefly turn the periodic attractor into a repeller. This requires a brief perturbation of a system parameter. This allows the chaotic attractor to persist at a given parameter value. Moreover, the chaotic transient is controlled to persist in non-chaotic parametric regions by minimal parameter fluctuations.

The present method is efficient in high-dimensional system where previous methods would require extremely complex computations. The sustained chaotic state is tracked (i.e., continued) with respect to a system parameter over a parameter range that includes a range of at least one order of magnitude wider than provided by previous methods in the art. The technique is generic in its most fundamental form, and can therefore be applied to various systems which include a $CO_2$-laser model and a high-dimensional continuum mechanics model.

The present method targets points near a chaotic transient, once the iterates reach a neighborhood of an undesired attractor. Targeting is done so that the natural dynamics of the system will engage again the iterations in chaotic motion. By making a brief parameter fluctuation, the attractor is forced to be a repeller so that a point which lies on the previously existing chaotic transient can be targeted. So instead of landing on the attractor, the iterations will reach a region of phase space where a chaotic transient is present, thereby causing the chaotic motion to be re-excited. Targeting is done close to the attractor, monitoring a chosen neighborhood, and modeling the system around the attractor based on a local linear approximation which can be obtained from a model as well as from real data. The present method takes into account both the topology of the phase space about the attractor and the escape regions.

The present method differs from existing methods for sustaining chaos in that the sustained chaotic transient can be tracked as a parameter is varied. Due to smoothly changing characteristics of the chosen regions and related topology, the sustained chaotic transient may be recreated at parameter values well beyond the original crisis value. Further details on the general theory of tracking unstable orbits is provided in I. B. Schwartz and I. Triandaf, Phys. Rev. A 46, 7439 (1992), I. B. Schwartz and I. Triandaf, *Control and Prediction in Seasonally Driven Epidemic Models, in Predictability and Nonlinear Modeling in Natural Sciences and Economics*, edited by J. Grasman and G. van Straten (Kluwer, Dordrecht, 1994), pp. 216–228, and I. B. Schwartz, T. W. Carr, and I. Triandaf, Chaos 7, 664 (1997), herein incorporated by reference.

Further details of the present invention are provided with reference to the figures. Referring now to FIG. 1, the relevant topology is shown for a general map f, where A denotes the attractor and CT the chaotic transient region. Shown in this schematic is the attractor, A, the basin saddle which provoked the disappearance of the attractor and the stable and unstable manifolds of this basin saddle. The attractor A is assumed to be proximate to the stable manifold of the saddle which forms the basin boundary of the attractor. Circle C is a neighborhood of the attractor A which intersects both the basin of attraction of A and a region containing points which approach the chaotic transient. This is the neighborhood monitored in this algorithm and control is activated every time iterations enter such a neighborhood. Point $f^{-1}(B)$ is a point on the stable manifold of the drawn saddle. A segment $f^{-1}(S)$ passes through $f^{-1}(B)$. The map takes the segment $f^{-1}(S)$ and the point $f^{-1}(B)$ into segment S and point B, respectively. Segment S and point B both lie in a neighborhood of the basin saddle. Therefore, parameter perturbations in the preimage neighborhood, near the attractor, will be represented similarly in the original image near the saddle due to continuity. The segment $f^{-1}(S)$ crosses the stable manifold, and intersects the basin of attraction of A and the chaotic transient. The end points of $f^{-1}(S)$ will separate dynamically: one end point, $E_A$, moving towards the attractor and the other, $E_{CT}$ starting to move chaotically.

In an actual implementation of this algorithm to a nonlinear dynamic system, the relevant topology needs to be probed for the relevant topology. This is done by finding a segment, $f^{-1}(S)$, with end points such that one end point goes to the attractor and the other end point goes to the chaotic region. Since the two diverging points create a segment which straddles the stable manifold, the procedure is called segmentation.

The process of segmentation guarantees that the segment is in an area close to the boundary of the attractor, and the end point which is mapped onto the chaotic transient region represents a good candidate for targeting. A parameter fluctuation which sends the iterates to such a point has the result that subsequently iterates will be chaotic since they are attracted to the chaotic transient. Chaos is reactivated by repeating the monitoring and actuation process based on segmentation.

One skilled in the art will recognize that since the segmentation procedure straddles a stable manifold, the procedure is similar in spirit to the proper interior maximum (PIM) triple procedure for computing orbits which lie on one-dimensional manifolds as provided in H. E. Nusse and J. A. Yorke, Ergod. Th. Dynam. Sys. 11, 189 (1991). Unlike the method presented in that reference, segmentation described here does not require a model.

To facilitate further understanding of how to sustain and track chaos using the present invention, it may be helpful to consider a generic high-dimensional Poincare map T:

$$x_{n+1}=T(x_n,\delta_n) \quad (1)$$

where $\delta_n=\delta_0+\Delta\delta_n$ is the parameter we adjust to sustain chaos. Assume T has a chaotic transient, and an attractor denoted by fixed point $(x_0, \delta_0)$ at parameter $\delta_0$. Applying the algorithm to Eq. (1) proceeds as follows: every time the iterations reach a prescribed neighborhood of the attractor $x_0$, control is activated. The parameter perturbation is chosen to target a preassigned value in a neighborhood of the end point, $E_{CT}$, $N(E_{CT})$, contained in a previously existing chaotic transient. So the value of $X_{n+1}$ is preassigned.

Targeting is accomplished by using two steps. First, pole placement is used to destabilize the attractor. Those skilled in the art will readily note that pole placement has previously been applied to the control of chaos using time series embedding. Then the destabilized system is used to target a point in $N(E_{CT})$. Linearizing T about the periodic attracting point $(x_0, \delta_0)$, produces $$x_{n+1}-x_0=A(x_0-x_0)+B(\delta_n-\delta_0), \quad (2)$$

where A is the derivative of the map with respect of x, and B is the derivative of the map with respect to $\delta$ at $(x_0, \delta_0)$. The perturbation of the parameter is given by $$\delta_n-\delta_0=-K(x-x_0), \quad (3)$$

The vector K from Eq. (3) is chosen in such a way that the target point $x_{n+1}$ will lie inside $N(E_{CT})$. This briefly changes the attractor into a saddle or into a repeller while simultaneously targeting. Since the attractors have well defined transients in a local neighborhood, it is easy to acquire linear least-squares approximations to Eq. (2) from embedded time series in order to derive the matrix A and the vector B from experimental data. Tracking is done by updating the linearized model (2) as $\delta_0$ is changed.

The present algorithm allows for continuing, or tracking, the sustained chaotic state as the parameter is increased without any premeasuring of the system. Increasing $\delta_0$ by a small amount, h, permits chaotic transients to persist at the new parameter value. As the parameter is increased, the position of the attractor changes continuously along with the relevant saddle. This saddle is connected to the stable manifold which is contained in the neighborhood targeted, C. However, the previous target point may not be suitable as a target point since it may no longer lie across the stable manifold. That is, the line segment connecting two diverging points at parameter $\delta_0$ may no longer satisfy the presumption at the new parameter value, $\delta_0+h$. Therefore, the position of the attractor has to be updated as well as the target point. Once these new values are determined, the presumption of the topology depicted in FIG. 1 will be satisfied, and the segmentation procedure can be implemented as before.

The new position of the attractor and its neighborhood can be easily found since the dynamics will asymptotically approach this attractor naturally. Next, an approximate location of the boundary separating the attractor and the chaotic transient at the new parameter value is determined. The approximate boundary is determined by locating a point which diverges from the attractor neighborhood. Some trial and error has to be used for this step in a real experiment. Given a model, a rigorous approach would be to locate the basin boundary accurately using an appropriate algorithm such as the PIM triple procedure. In practice, probing a few target points is sufficient to approximate a segment which crosses the boundary defined by a stable manifold.

To make this probing effective, the previous target point is selected as the new target point. If the previous target point is attracted to the new attractor, then the attractor at the new parameter value is turned (i.e., changed) into a repeller using pole-placement methods. Now that local neighborhood about the attractor is repelling, a few points distributed around it are selected to see where the dynamics sends them in the short time. If one of these points evolves into chaotic motion, that point is chosen as the target point and it is used to sustain chaos at this new parameter value. The point is said to be targetable if the point is parametrically accessible from the repelling neighborhood. That is, if points begin to approach the attractor, creating a repeller enables the location of a targetable point. Once a targetable point is located, a segment may be constructed between an attracting point and the targetable point which intersects the stable manifold.

In contrast to acquiring a targetable point, if all of the chosen points fall back on the attractor, the indication is that the attractor is too far from the boundary and tracking cannot proceed any further under the presumption illustrated in FIG. 1. This is due to the fact that a segment intersecting the boundary cannot be constructed for the sample of points considered.

At parameter values near the crisis value, the problem of finding a segment intersecting the boundary does not exist when the crisis is near a saddle-node bifurcation point. The attractor is initially close to its basin boundary by the nature of the type of crisis considered, so tracking can be done as the parameter increases while close to the crisis parameter value.

How far the segmentation procedure may be extended for larger values of δ depends on the problem being considered (e.g., the system employing the segmentation procedure). In the case of a low-dimensional model, tracking procedure can be pursued considerably past the crisis parameter value. Therefore, the success of tracking depends on the attractor neighborhood remaining sufficiently close to the stable manifold boundary, which is always the case initially at the crisis value, so delay of the crisis is always possible.

Figure 2:
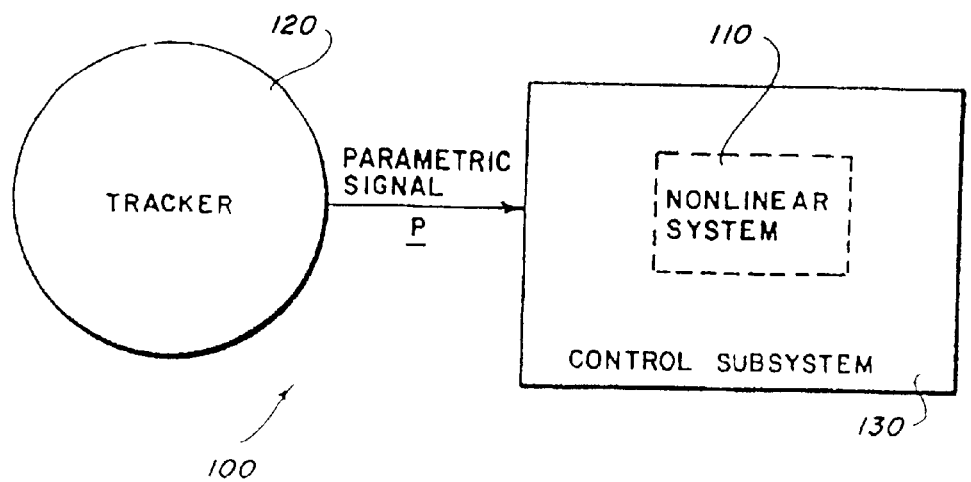
FIG. 2 is a highly schematic diagram of a system for tracking and controlling a nonlinear system.

Implementation of the present algorithm is depicted in FIG. 2 which shows a highly schematic view of control system 100 for tracking a nonlinear system 110. Control system 100 has broad scope and applies control to many nonlinear systems 110, such as lasers and nonlinear optical devices, electronic circuits, coupled lasers, convection, chemical reactions and processes, structural mechanics, smart materials, robotics, nuclear reactors, extrusion of polymer melts, and biological systems such as hearts (cardiac arrhythmia), muscles (tremors), and nervous systems (epilepsy).

System 100 comprises a tracker 120 for generating a parametric signal P and applying parametric signal P to a control subsystem 130, and the control subsystem 130 for controlling the nonlinear system 110 at the parametric signal P. The parametric signal P can be external to the nonlinear system 110, or it can be part of the nonlinear system 110. As an example of the latter condition, the parametric signal P can be the parametric value of a component (not shown) of the nonlinear system 110, such as a resistor or transistor.

Figure 3:
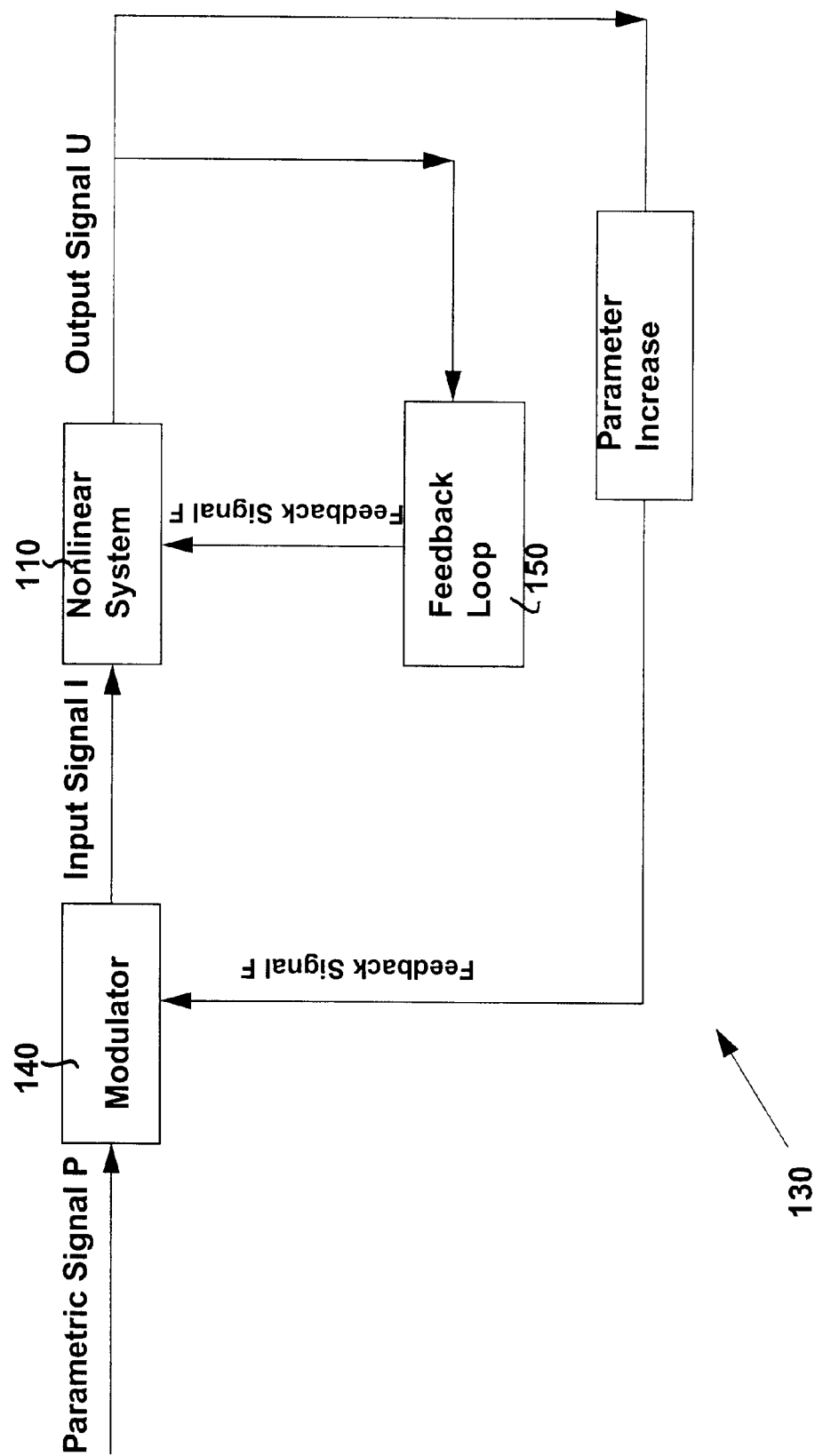
FIG. 3 is a more detailed schematic view of the control system of FIG. 2.

Referring now to FIG. 3, the control subsystem 130 is a feedback control system responsive to the applied parametric signal P. The parametric signal P may be considered the bias or dc value of the control subsystem 130, although the parametric signal P is not necessarily a direct current signal. A modulator 140 modulates or combines the parametric signal P by or with a feedback signal F to produce an input signal I for application to the nonlinear system 110. For example, the modulator 140 could perform amplitude modulation or frequency modulation. As a further example, the parametric signal P could be a dc signal, and the feedback signal could be considered a fluctuation signal. The modulator 140 could then sum the parametric signal P and the feedback signal F to produce the input signal I.

Figure 4:
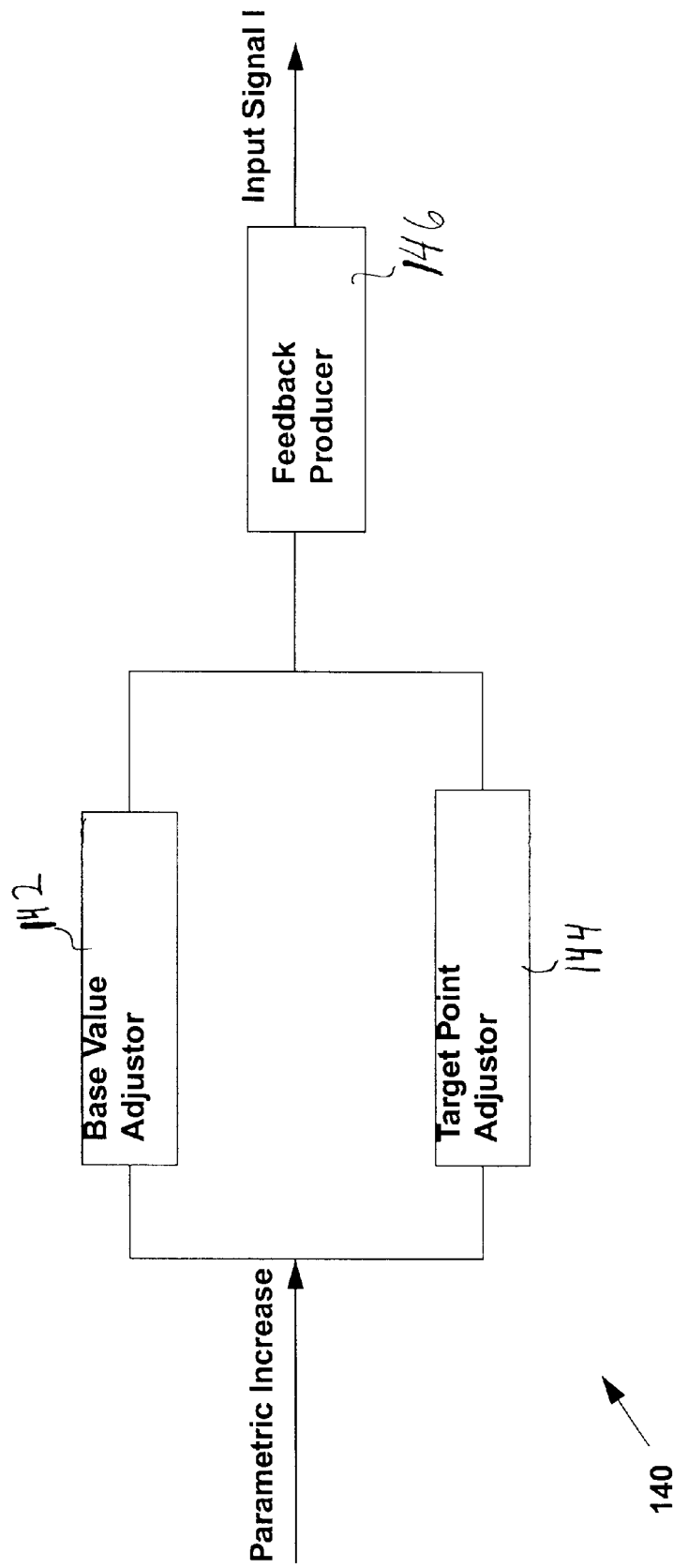
FIG. 4 is a more detailed schematic view of the modular of the control system depicted in FIG. 3 showing of how tracking is accomplished.

Referring now to FIG. 4, an exemplary Modular 140 includes Base Value Adjustor 142 for recalculating $X_0$ and Target Point Adjustor 144 for re-calcalulating $X_{n+1}$ using formulas (2) and (3). Recalculation is necessary after varying the parameter by a large step. Feedback Producer 146 generates Input Signal I based on the calculated values of $X_0$ and $X_{n+1}$.

Referring back to FIG. 3, in response to the input signal I, the nonlinear system 110 produces an output signal U. Although the nonlinear system 110 need not be any particular type of system, the input signal I and the output signal U are preferably electrical signals. If the nonlinear system 110 is a laser, for example, output signal U could include photodetector means (not shown) for converting light to an electrical signal I.

A feedback loop 150 is responsive to the output signal U and produces the feedback signal F. The control subsystem 130 typically uses a small amplitude control technique, although the nonlinear system 110 may show a nonlinear response when operated at the parametric signal P.

Feedback loop 150 creates a shift in the control system parameter parametric signal P based on the output signal U. This shift is calculated according to formulas (2) and (3). In these formulas, $X_0$ is an attractor and $X_{n+1}$ is a point to be targetted by formulas (2) and (3). As a result, the output signal U consists of a sequence of signals $U_n$ with discrete values.

The nonlinear system 110 is a dynamical system. The evolution of the nonlinear system 110 dynamics may be represented by a state variable flow vector X(t,p), dependent on time t and parameter p, the value of the parametric signal.

The flow vector X(t,p) is constructed from a measured time series by the delay coordinate embedding technique, well known to persons of ordinary skill in the art. This flow vector X(t,p) is then converted to a state variable map vector Xn(p) by sampling the flow vector X(t,p), for example by taking an experimental sequence of the output signal U at evenly spaced intervals. The state variable map vector Xn(p) can be used to predict the output signal U. The map is described as $$\vec{X}_{n+1} = h(\vec{X}_n, p).$$

Using known techniques of embedology, a reconstruction of the chaotic attractor for the nonlinear system 110 is obtained from the time series. Next an experimental surface of section is obtained (a Poincare map) by sampling the embedded flow discretely. A particular chaotic transient is selected.

An exemplary implementation of the above-described theory is provided by control subsystem 130 that keeps the nonlinear system 110 in a chaotic state by monitoring a neighborhood of an undesirable periodic. A window is selected for the feedback signal F. If the n-th iteration of the feedback signal $F_n$ falls outside of that window, then the n-th iteration feedback signal $F_n$ is set to zero. In other words, control is left off. The nonlinear system 110 will eventually fall within a neighborhood of the attractor. If the n-th iteration falls within a predetermined neighborhood of a previous iteration, then the output signal U at iteration n, $U_n$, is used to generate the iteration-n feedback signal $F_n$, so that the n+1 iteration of the surface of section space point $X_{n+1}$ will fall outside the neighborhood of the previous iteration and close to a pre-assigned thereby maintaining chaos in and stabilizing operation of the nonlinear system 110.

Figure 5:
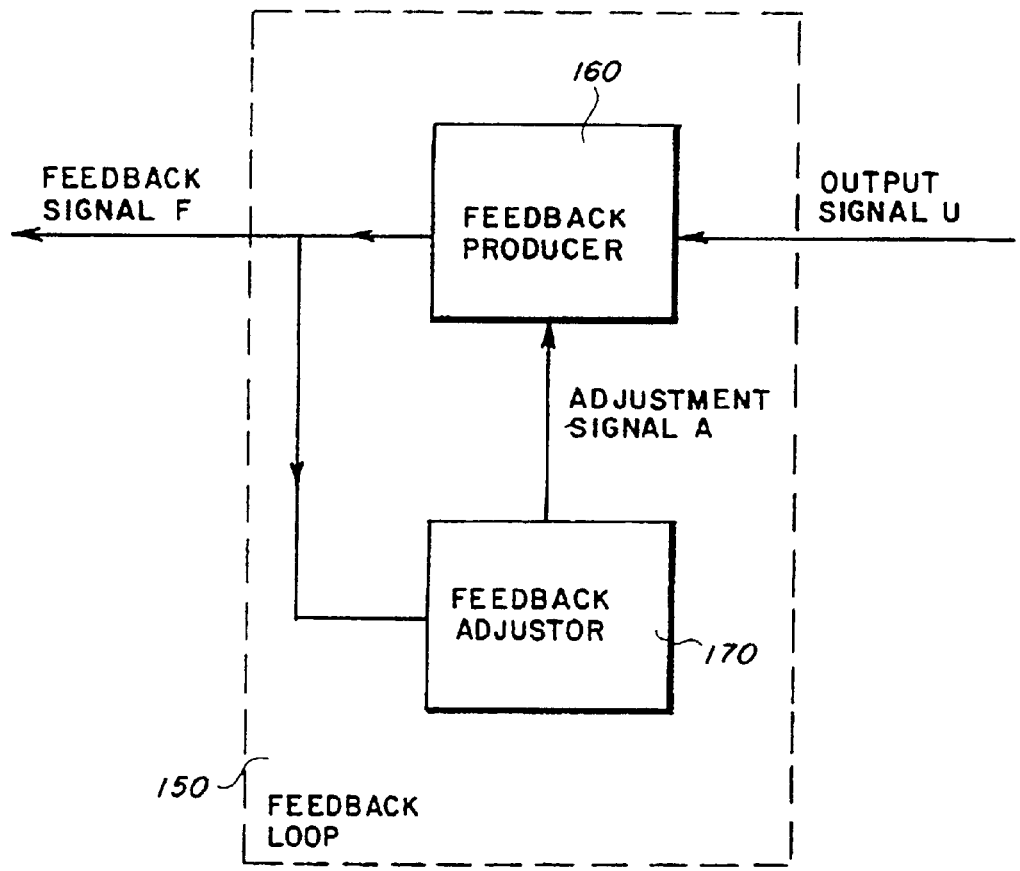
FIG. 5 is a more detailed schematic view of an exemplary feedback loop of the control system depicted in FIG. 3.

Referring now to FIG. 5, an exemplary feedback loop 150 includes a feedback producer 160 responsive to the output signal U and to an adjustment signal A for producing the feedback signal F by applying formulas (2) and (3) when $X_0$ and $X_{n+1}$ are known. A feedback adjustor 170 recalculates $X_0$ and $X_{n+1}$ in formulas (2) and (3). This recalculation is necessary after making a large change (i.e., variation) in the parameter. So the algorithm proceeds as a parameter is increased in steps. Such a procedure is referred to as tracking. Once $X_0$ and $X_{n+1}$ are recalculated, formulas (2) and (3) can be used.

Figure 6:
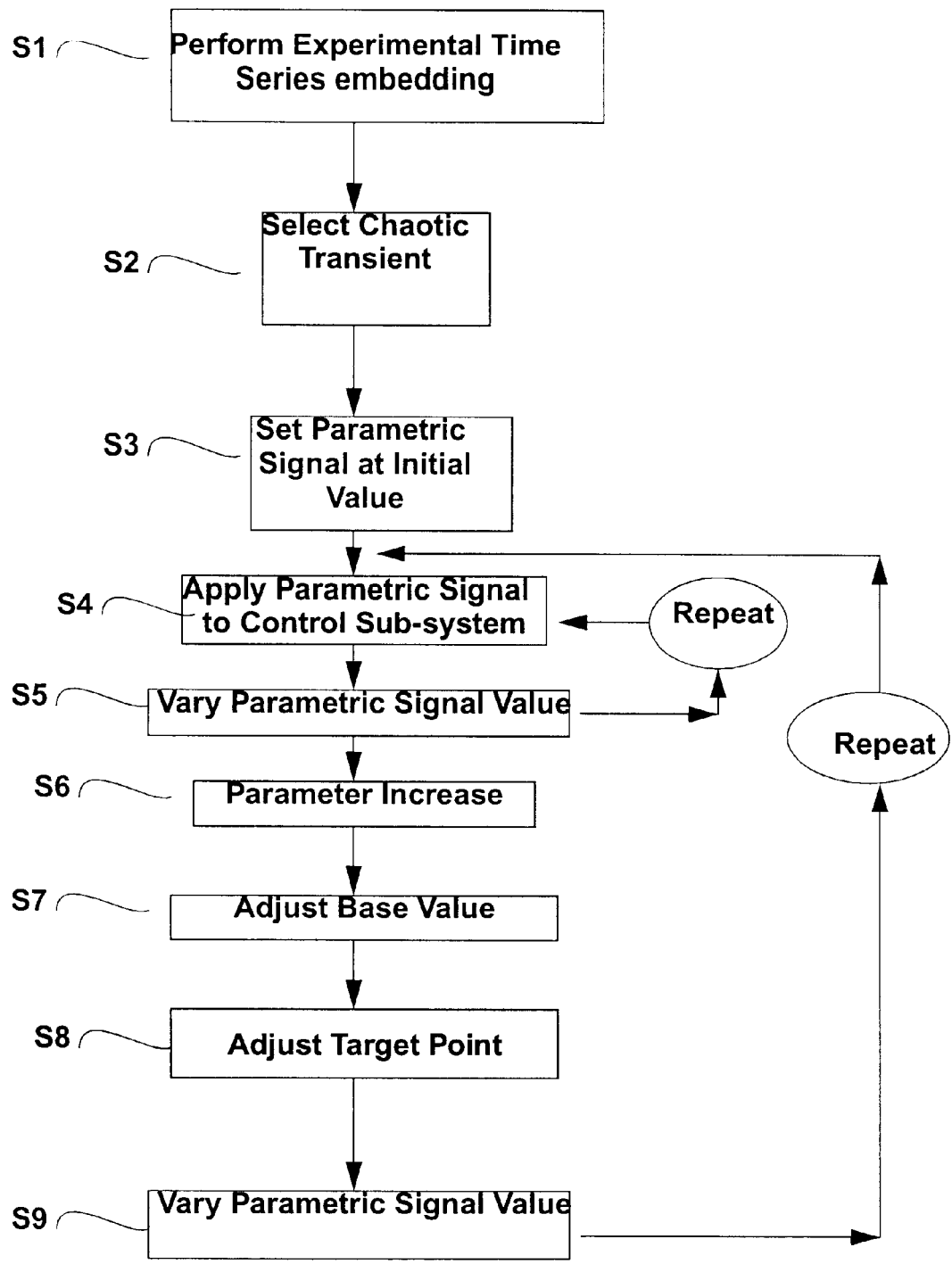
FIG. 6 is a flowchart of a tracking operation of the control system depicted in FIG. 2.

Further understanding of the present invention and in particular the overall operation of system 100 is provided by reference to FIG. 6 which depicts a flowchart of a preferred method of tracking operation of the control system 130. Turning now to FIG. 6, along with FIGS. 2–5, although not absolutely required for the practice of this invention, step S1 is the operation of the nonlinear system 110 without control to obtain a time series of experimental data. The experimental time series embedding discussed earlier is performed, and the data obtained as a result thereof is considered an embedded signal. This data/signal is useful for later steps. Step S2 consists of the selection of a chaotic transient for tracking on. The embedding data/signal may be used for this step.

In step S3, the tracker 120 sets the parametric signal P at an initial value. This initial parametric value may be selected, determined so as to satisfy specified conditions, or be otherwise set, for example, by default. If it is desired to operate the control subsystem 130 over a specified range of parametric values, the initial parametric value could be selected to be outside that range but near an end point of the range. Using the embedology data/signal, the initial parametric value is preferably selected so that upon application of the parametric signal P at the initial parametric value, the nonlinear system 110 operates on the selected chaotic transient.

Step S4 is the application by the tracker 120 of the parametric signal P at the initial parametric value to the control subsystem 130 so that the nonlinear system produces an initial output signal U. Step S5 consists of applying formulas (2) and (3) when $X_0$ and $X_{n+1}$ are known.

Steps S7, S8 perform recalculating $X_0$ and $X_{n+1}$ in formulas (2) and (3). This recalculation is necessary after varying the parameter by a large step (which is done in S6).

As discussed above, tracking occurs by allowing the algorithm to proceed as a parameter is increased in subsequent repeated step S6 as provided by steps S6, S7, S8, S9. Once $X_0$ and $X_{n+1}$ are recalculated, formulas (2) and (3) can be used for step S4. So each tracking step starts with S6 loops through S7, S8, S9 and reactualizes S4. $S_5$ and $S_4$ alternate. In FIG. 6, S4 is put first assuming a good initial guess was made. In any case, steps S4 and S5 alternate with each other during control of system 110.

Still further understanding of the present invention is provided through the use of the following non-limiting exemplary implementation of the present invention comprising a laser system. The laser system is a periodically forced laser well known in the art with topology of the manifolds which form chaotic transients arising from horseshoe dynamics as:

$$\frac{du}{dt} = -u[\delta\cos(\Omega t + \Psi) - z], \qquad (4)$$

$$\frac{dz}{dt} = -\varepsilon_1 z - u - \varepsilon_2 z u + 1,$$

where u and z denote (scaled) intensity and population inversion. $\delta$ represents the amplitude of the drive. The fixed parameters and their values are $\varepsilon_1$=0.09, $\varepsilon_2$=0.003, and $\Psi$=0.

Figure 7:
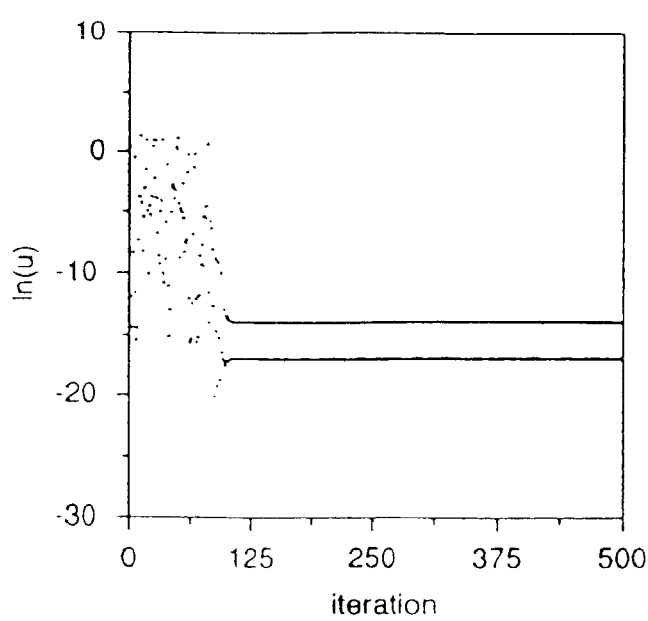
FIG. 7 is a plot of iterations for In(u) at $\delta=1.88$ illustrating a chaotic transient landing on a period-4 attractor.

For $\delta$ slightly past a critical value $\delta_c$, a chaotic saddle is created due to the unstable manifold of the basin boundary saddle crossing its stable manifold. Almost all points in the region near the saddle now converge to a period-4 attractor which has period-doubled off the period-2 branch. A chaotic transient typically settles into a period-4 attractor after about 100 iterations as shown in FIG. 7.

Figure 8:
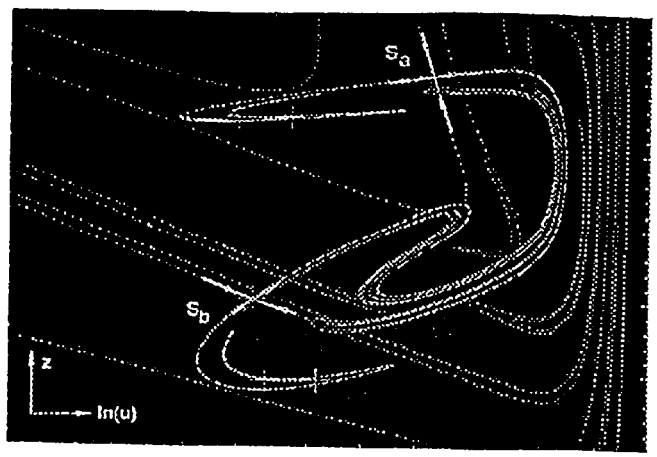
FIG. 8 is a plot illustrating the topography set-up for a laser model implementing the present invention.

FIG. 8 shows the topology of the phase space corresponding to Eq. (4). As depicted, the attractor of period-4 and the period-2 basin saddle with its stable and unstable manifolds. In addition, a horseshoe is created from the right; i.e., the unstable manifold to the right of the stable manifold crosses the stable manifold near $S_a$. Almost all points in the region near the saddle now converge to a period-4 orbit which has period-doubled off the period-2 branch. The purpose of our method is to make the chaotic transients persist by preventing the flow from being captured by the attracting orbit.

Figure 9:
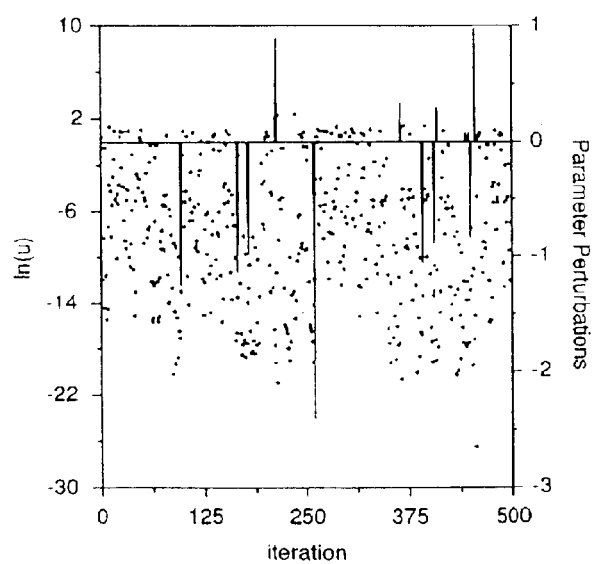
FIG. 9 is a plot of iterations depicting sustained chaos using the present invention.

FIG. 9 depicts the iterates of T(dots) after applying the sustained chaos algorithm guided by Eq. (3). The chaotic transients were prolonged on average by 350 period-2 iterations, which translates to 700 iterations of the drive period. In FIG. 9, the right axis illustrates the parameter perturbations used to sustain the chaotic saddle. As is apparent to one skilled in the art, only 13 parameter fluctuations were needed. To demonstrate that the fluctuations resulted in induced chaotic behavior, the maximum Lyapunov exponent was calculated to be approximately 0.14 as determined from the linear variational equations along the parametrically perturbed trajectory in FIG. 9.

Figure 10:
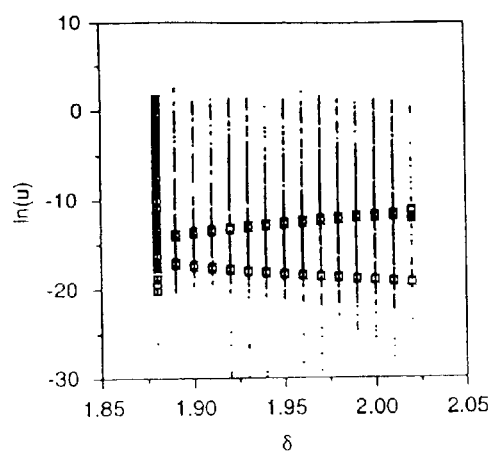
FIG. 10 is a plot depicting sustained chaos tracked as the parameter $\delta$ is increased according to the present invention.

In the above numerical experiments the segmentation-tracking technique was applied every other period, activating parameter perturbations every time the dynamics lands within a neighborhood of a (period-4) attractor. The vector K was reconstructed at each increment in $\delta$. At each parameter value, 400 chaotic iterates (dots) were sustained as depicted as vertical lines in FIG. 10. Also plotted in FIG. 10 is the bifurcation picture of attractors without parameter control (open boxes). From FIG. 10, it will be apparent to one of ordinary skill in the art that the range over which tracking is now possible, removes the restriction of sustaining chaos close to a crisis parameter value.

Periodic saddles which are responsible for the observed global dynamical behavior typically persist over very large ranges of parameter values, which is the case for Eq. (1). Tracking sustained chaos is possible since these saddles naturally persist, so the global structure of the stable and unstable manifolds of this persisting periodic saddle intersect transversally as they did for the original chaotic transient. As the system is perturbed, the horseshoe dynamics is being reexcited and chaos is induced, as evidenced by the positive Lyapunov exponent.

To facilitate understanding of how the present invention may be incorporated into a high-dimensional model, a high-dimensional coupled-pendulum model is used as an exemplary embodiment of the present invention. The high-dimensional coupled-pendulum model consists of a forced damped pendulum attached to a stiff rod which is flexible and moves periodically in a vertical plane. The system was first examined when operating in a resonant mode, where the pendulum frequency is half that of the fundamental frequency of the rod. As is known to one skilled in the art, when the rod is sufficiently stiff, the dynamics resides on a global slow invariant manifold; the rod is slaved to the motion of the pendulum, so the dynamics is a perturbation of a parametrically driven pendulum. When operating at resonance, there exists a critical amplitude of the driving force that causes an abrupt change from periodic behavior to high-dimensional hyperchaotic behavior where there are two or more positive Lyapunov exponents. Chaos appears discontinuously, without a bifurcation sequence to chaotic behavior. Chaos appears as a subcritical bifurcation point since it exhibits hysteric behavior as a function of the amplitude of the forcing.

The tracking sustained chaos algorithm was applied to the high-dimensional continuum mechanics model for the set of parameter values which exhibits hyperchaos (more than one positive Lyapunov exponent). This model describing a pendulum attached to a flexible support is derived in I. T. Georgiou and I. B. Schwartz, SIAM (Soc. Ind. Appl. Math.) J. Appl. Math. 59, 1178 (1999) herein incorporated by reference.

The support of the pendulum is a linear viscoelastic rod restricted to undergo planar vertical motion subject to a time-dependent motion $x_A(t)=\alpha \cos \omega t$, at its upper end, A. $X_B(\tau)$ is the motion of the bottom of the rod relative to the support. The rod equation (dimensionless) modeling the displacement field, V, and angular displacement of the pendulum $\theta$ is given by $$\ddot{\theta} = -[1 - \ddot{V}(\xi=1, \tau) + \ddot{X}_A(\tau)]\sin(\theta) - 2\zeta_p\dot{\theta}, \quad (5)$$

$$\frac{\mu^2\pi^2}{4}V_{,\tau\tau}(\zeta,\tau) = V_{,\xi\xi}(\xi,\tau) + 2\zeta_r\mu V_{,\tau\xi\xi}(\xi,\tau)$$

$$-\frac{\mu^2\pi^2}{4}\ddot{X}_A(\tau), \quad (6)$$

$$V(\xi=0, \tau) = 0,$$

$$V_{,\xi}(\xi=1, \tau) = -\frac{\mu^2\beta\pi^2}{4}[1 - T\cos(\theta)], \quad (7)$$

where $$T=\theta^2+[1-\ddot{X}_B(\tau)]\cos(\theta). \quad (8)$$

The variable $V(\xi,\tau)$ denotes the normalized displacement field with respect to the normalized static displacement field. Further, $\mu$ is a ratio of the frequencies, $\xi_p$ is a damping factor, $\beta$ is the mass ratio, $\tau$ is the pendulum tension and $X_B$ is the normalized displacement of the endpoint of the rod, i.e. the point where the rod and the pendulum connect.

Equation (7) gives the boundary conditions for the coupled rod (6). Equation (8) gives the normalized tension T along the pendulum arm. A bifurcation to high-dimensional hyperchaos is characterized in both the number of active modes and the number of positive Lyapunov exponents increase discontinuously, thereby making the system high dimensional and hyperchaotic.

The solution of Eq. (5) is expanded using a Galerkin approximation in space and a set of coupled oscillators is obtained. In what follows, a first-order truncation yields a linear-nonlinear driven coupled oscillator system. Fixed parameter values are $\mu=0.577$, $\xi_p=\xi_r=0.01$, $\omega=1.952$, $\beta=1$. The discrete dynamics generated by sampling at the forcing frequency is four-dimensional. The chaotic transient (when sustained) has two positive Lyapunov exponents, with values 0.21 and 0.04 when $\alpha=0.36$. The perturbation parameter for tracking sustained chaos is $\alpha$.

Figure 11:
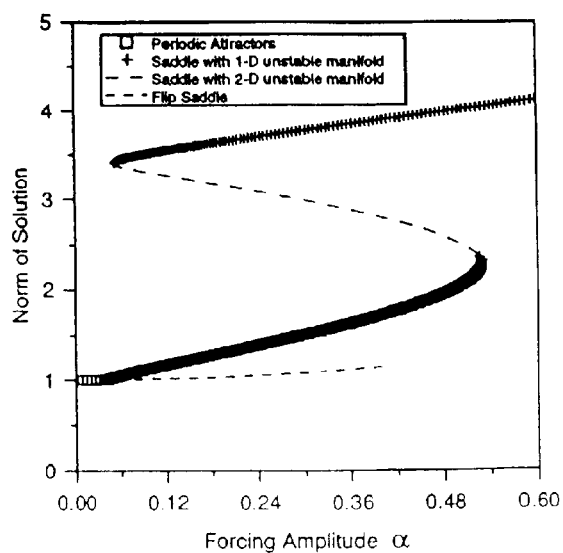
FIG. 11 is a bifurcation diagram showing the branches of periodic solutions as a function of $\alpha$ for a one-mode model according to the present invention.

The bifurcation structure of the one-mode model derived from Eqs. (5)–(8) is shown in FIG. 11 as a function of forcing amplitude $\alpha$. In FIG. 11, there are two coexisting branches of saddles in the parameter region of interest, in addition to a coexisting attracting branch. One branch of saddles has a one-dimensional unstable manifold, while the other has a two-dimensional unstable manifold as is apparent from the disclosure above. The high-dimensional unstable direction is conjectured to be the source of hyperchaotic transients; i.e., chaos having more than one positive Lyapunov exponent. This situation shown in FIG. 11 is complex since (i) chaos is hyperchaotic with two positive Lyapunov exponents, (ii) a connecting branch of saddles has a two-dimensional unstable manifold, and (iii) it is not clear which saddle is the basin boundary saddle. Such complications make it difficult to sustain chaos based on basin boundary saddle method such as those in less complex systems. However, the segmentation-tracking procedure allows one to overcome such difficulties.

Figure 12:
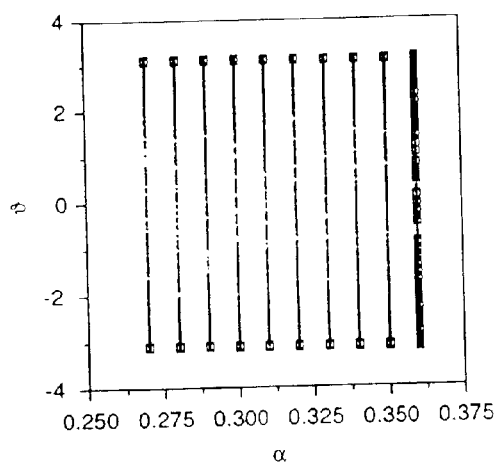
FIG. 12 is a plot of $\alpha$ versus frequency showing sustained chaos for a coupled rod-pendulum implementing the present invention.
Figure 13:
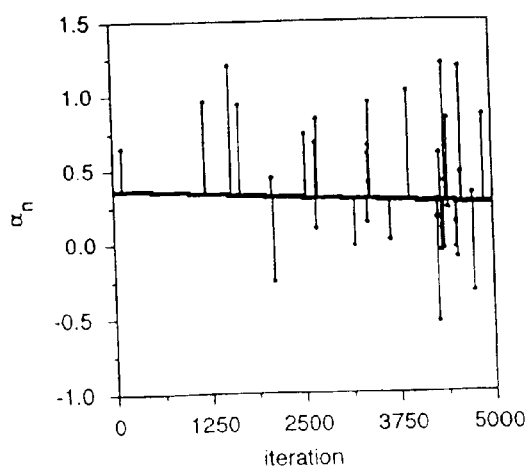
FIG. 13 is a plot of iterations versus $\alpha_n$ showing the parameter values and perturbations of $\alpha$ used to track sustained chaos in a rod-pendulum model implementing the present invention.

FIG. 12 tracks chaotic state for 10 steps, started at $\alpha=0.36$, and the tracked for decreased $\alpha$. For each parameter value, the chaotic iterations (dots) appear in FIG. 12 along a vertical line. The same trajectory, when the algorithm is not applied, would collapse on the periodic attractor (shown as open squares). The parameter perturbations used to obtain FIG. 12 are shown in FIG. 13 for the entire run as a function of iteration. For each fixed parameter in FIG. 11, 500 iterations were computed.

As should now be apparent to one skilled in the art, tracking sustained chaos is an improvement over previous methods where chaos was sustained only at a fixed parameter value. Such a method requires only partial knowledge of the phase space and applies to systems modeled from time series, which makes it suitable for experiments. A definitive advantage is that the technique can be more easily implemented than previous methods when applied to higher dimensional systems since the accurate description of stable and unstable manifolds governing the crisis may be extremely hard to compute in higher dimensions.

In addition to the previously described exemplary applications, the present invention can also be employed in numerous additional applications where chaos is observed. For example, chaotic behavior has been observed in lasers, electronic circuits, chemical systems and biological systems. In these instances, implementation of the present invention permits an attractor that lies sufficiently close to the former basin boundary of the chaotic attractor to be targeted from the attractor. In the above mentioned areas, an undesirable resonant behavior may be eliminated by using the present invention to employ chaos whereby spreading the energy over a wide frequency range.

For example, the present invention can be used in a machine application such as to eliminate resonant behavior in favor of small amplitude chaotic motion. This in turn can be applied to prevent damage in materials, crane control, control of coupled mechanical systems.

Another mechanics application suitable for incorporation of the present invention is in machine tool cutting. The implementation involves describing naturally and optimally motions as small amplitude chaos, where periodic behavior is undesirable.

Further, the present invention can be applied to biological applications. Chaotic behavior is natural and desirable in self-excitatory biological processes such as the heart beat and neuronal discharge. Periodic behavior in these system signals pathological phenomena. The general thesis that loss of chaos is associated with disease has also been found. A diverse list of examples of emergent pathophysiological periodicity in otherwise more irregular normal time dynamics includes: cell counts in hematological disorders, stimulant drug induced abnormalities in patterns in time of the behavior of brain enzymes, receptors, and animal explorations of space, cardiac interbeat interval patterns in a variety of cardiac disorders, the resting record in a variety of signal sensitive biological systems following desensitization, experimental epilepsy, hormone release patterns correlated with the spontaneous mutation of a neuroendocrine cell to a neoplastic tumor, the prediction of immunological rejection of heart transplants, the electroencephalographic behavior of the human brain in the presence of neurodegenerative disorders, neuroendocrine, cardiac and electroencephalographic changes in aging, and imminent ventricular fibrillation in human subjects.

In addition, the present invention has possible uses in the prevention of the extinction of species. It has been previously shown that the disappearance of chaos may signify species extinction in certain ecological models. The present invention could be used for species preservation by introducing few members of a species into the population at carefully chosen time intervals.

In addition, the present invention can be employed in chemical applications where chaotic behavior is desired. One such application is in the mixing of fluids. An additional chemical application includes a thermal pulse combuster which operates chaotically when running with a lean fuel-air mixture, but attempts to improve fuel efficiency (e.g., by making the mixture even leaner), can destroy chaos and possibly result in the combustor to flameout.

Further, the present invention can have applied to electrical systems. For example, it has been shown to be beneficial to sustain chaos in electrical power systems. These systems can be modeled as nonlinear dynamical systems and which undergo instability manifested as voltage collapse when heavily loaded. Due to ever-increasing demand for electrical power, there are many instances when the power system operates near the edge of instability. In these models, the instability corresponds to a crisis on a chaotic attractor. When over loaded, the system behaves chaotically, and further increasing the loading a crisis occurs and the chaotic attractor disappears leading to voltage collapse.

A further application of the present invention is in its implementation in emerging technology of communication using chaos. In such a communication system, a message is embedded in a chaotic carrier and transmitted to receiver system where the message is recovered from chaos. Chaotic optical waveforms can thus be used to communicate masked information at high bandwidths. In such an application, maintaining chaos is essential.

Although the invention has been described above in relation to preferred embodiments thereof, it will be understood by those skilled in the art that variations and modifications can be effected in these preferred embodiments without departing from the scope and spirit of the invention.

What is claimed is:

1. A method for controlling the operation of a nonlinear system responsive to parametric signals for sustaining and tracking a chaotic system, said method comprising the steps:

(a) representing a nonlinear dynamic system as a function of a system parameter, wherein the function is represented by the formula: $x_{n+1}=T(x_n, \delta_n)$, and the system parameter is represented by: $\delta_n=\delta_n+\Delta\delta_n$, and an output value;

(b) generating a parametric signal corresponding to an initial value of the system parameter;

(c) producing an output signal corresponding to an output value from the nonlinear system in response to the parametric signal;

(d) calculating iterations of the function; and (e) generating a new parametric value if a current iteration falls within a predetermined neighborhood of a previous iteration by calculating $x_0$ and $X_{n+1}$ in the formula: $x_{n+1}-x_0=A(x_n-x_0)=B(\delta_n-\delta_0)$,
   where A is the derivative of T with respect to x and B is the derivative of the T with respect to $\delta$ at $(x_0, \delta_0)$; and
   the perturbation of the system parameter is given by the formula:
   $(\delta_n-\delta_0)=-K(x-x_0)$ where vector K is such that target point, $x_{n+1}$ lies inside a neighborhood of an endpoint of a previously existing chaotic transient;
   wherein the new parametric value is applied to the nonlinear dynamic system.

2. The method of claim 1, further comprising a repeating of steps (c)–(e).

3. The method of claim 1, wherein a resonant behavior is replaced by a small amplitude chaotic motion in a machine application.

4. The method of claim 1, wherein a periodic behavior is replaced by a small amplitude chaos in a machine tool cutting application.

5. The method of claim 1, wherein a chaotic behavior is sustained in a biological system.

6. The method of claim 1, wherein a chaotic behavior is sustained in an electrical power system.

7. The method of claim 1, wherein a chaotic behavior is sustained in a chemical application.

8. A controller for the operation of a nonlinear system responsive to parametric signals for sustaining and tracking a chaotic system, said controller comprising:

a monitor for detecting an output value from the nonlinear system;

a processor for calculating iterations of a function representing the nonlinear system as a function of a parametric value and said output value, wherein said function is represented by the formula: $x_{n+1}=T(x_n, \delta_n)$, and said system parameter is represented by: $\delta_n=\delta_0+\Delta\delta_n$; said processor operable to perform parameter perturbations to generate a new parametric value if a current iteration falls within a predetermined neighborhood of a previous iteration and wherein said processor is operable to calculate $x_0$ and $x_{n+1}$ in the formula:
   $x_{n+1}-x_0=A(x_n-x_0)=B(\delta_n-\delta_0)$,
   where A is the derivative of T with respect to x and B is the derivative of the T with respect to $\delta$ at $(x_0, \delta_0)$; and
   the perturbation of said system parameter is given by the formula:
   $(\delta_n-\delta_0)=-K(x_0, \delta_0)$ where vector K is such that target point, $x_{n+1}$ lies inside a neighborhood of an endpoint of a previously existing chaotic transient; and an input device for applying said parametric value to the nonlinear system.

9. The controller of claim 8, wherein the controller replaces a resonant behavior with a small amplitude chaotic motion in a machine application.

10. The controller of claim 8, wherein the controller replaces a periodic behavior with a small amplitude chaos in a machine tool cutting application.

11. The controller of claim 8, wherein the controller sustains a chaotic behavior in a biological system.

12. The controller of claim 8, wherein the controller sustains a chaotic behavior in an electrical power system.

13. The controller of claim 8, wherein the controller sustains a chaotic behavior in a chemical application.

14. A system for controlling the operation of a nonlinear system, said system comprising:

means for generating a parametric signal having a parametric value, wherein said means for generating applies the formula: $x_{n+1}=T(x_n, \delta_n)$, and said parametric value is represented by: $\delta_n=\delta_0+\Delta\delta_n$; and controlling means responsive to the parametric signal for controlling the nonlinear system, said controlling means comprising:

a modulator responsive to the parametric signal and to a feedback signal for producing and applying an input signal to the nonlinear system to cause the nonlinear system to produce an output signal having an output value;

means responsive to said output signal for producing said feedback signal; and correcting means, operable when a current iteration of a function representing the nonlinear dynamic system in terms of said parametric value and said output value falls within a predetermined neighborhood of a previous iteration, for performing parameter perturbations to vary said feedback signal; wherein said correcting means calculates $x_0$ and $x_{n+1}$ in the formula:

$x_{n+1}-x_0=A(x_n-x_0)=B(\delta_n-\delta_0)$, where A is the derivative of T with respect to x and B is the derivative of the T with respect to $\delta$ at $(x_0, \delta_0)$; and the perturbation of said feedback signal is given by the formula:

$(\delta_n-\delta_0)=-K(x-x_0)$ where vector K is such that target point, $x_{n+1}$ lies inside a neighborhood of an endpoint of a previously existing chaotic transient.

15. The system of claim 14 wherein the nonlinear system is an excitable cell membrane.

16. The system of claim 14 wherein the nonlinear system is an electronic system.

17. The system of claim 14 wherein the nonlinear system comprises a laser system.

18. The system of claim 14 wherein the nonlinear system is a chemical system.

19. A system for tracking chaos, said system comprising:

a nonlinear system having means for generating a parametric signal at an initial time with an initial selected value and at least one subsequent time with at least one subsequent value different from said initial value, wherein said means for generating applies the formula: $x_{n+1}=T(x_n, \delta_n)$, and said parametric value is represented by: $\delta_n=\delta_0+\Delta\delta_n$; and means responsive to said parametric signal for controlling the nonlinear system at said initial time and at said at least one subsequent time, said controlling means comprising:

a modulator responsive to said parametric signal and to a feedback signal for producing and applying an input signal to the nonlinear system to cause the nonlinear system to produce an output signal;

means responsive to said output signal for producing and varying said feedback signal when a current iteration of a function representing the nonlinear dynamic system in terms of a value of said parametric signal and a value of said output signal falls within a predetermined neighborhood of a previous iteration; and correcting means for calculating $x_0$ and $x_{n+1}$ in the formula:

$x_{n+1}-x_0=A(x_n-x_0)+B(\delta_n-\delta_n)$, where A is the derivative of T with respect to x and B is the derivative of the T with respect to $\delta$ at $(x_0, \delta_0)$; and the perturbation of said feedback signal is given by the formula:

$(\delta_n-\delta_0)=-K(x-x_0)$ where vector K is such that target point, $x_{n+1}$ lies inside a neighborhood of an endpoint of a previously existing chaotic transient.

20. The system of claim 19 wherein said nonlinear system comprises a laser system.

21. The system of claim 19 wherein said nonlinear system is an electronic system.

* * * * *